United States Patent [19]

Takagi

[11] 4,296,054
[45] Oct. 20, 1981

[54] METHOD FOR PRODUCTION OF POLYURETHANE CUSHION MATERIAL

[76] Inventor: Sadaaki Takagi, 39, Mikage-cho, Okazaki-shi, Aichi-ken, Japan

[21] Appl. No.: 108,556

[22] Filed: Dec. 31, 1979

Related U.S. Application Data

[60] Division of Ser. No. 893,277, Apr. 5, 1978, abandoned, which is a continuation of Ser. No. 742,568, Nov. 17, 1976, abandoned.

[30] Foreign Application Priority Data

Nov. 18, 1975 [JP] Japan ............................. 50-138520

[51] Int. Cl.³ ............................................. B29D 27/04
[52] U.S. Cl. .................................... 264/45.3; 264/103; 264/257; 264/282; 428/280; 428/300; 428/310
[58] Field of Search ....................... 264/45.3, 103, 257, 264/282; 428/280, 300, 310

[56] References Cited

U.S. PATENT DOCUMENTS

| | | | |
|---|---|---|---|
| 2,140,063 | 12/1938 | Talalay | 264/45.3 |
| 2,159,213 | 5/1939 | Howard | 264/45.3 X |
| 2,194,036 | 3/1940 | Talalay | 264/45.3 |
| 2,290,614 | 7/1942 | Rathbun | 264/45.3 |
| 2,827,666 | 3/1958 | Wagner | 264/45.3 X |
| 2,879,197 | 3/1959 | Muskat et al. | 264/45.3 X |
| 2,972,554 | 2/1961 | Muskat et al. | 264/45.3 X |
| 3,050,427 | 8/1962 | Slayter et al. | 264/45.3 X |
| 3,193,598 | 7/1965 | Schafer | 264/45.3 X |
| 3,382,302 | 5/1968 | Marzocchi | 264/45.3 |
| 3,383,273 | 5/1968 | Pearson et al. | 428/300 |
| 3,500,840 | 3/1970 | Parrish | 428/310 X |
| 3,546,060 | 12/1970 | Hoppe et al. | 264/45.3 X |
| 3,617,594 | 11/1971 | Willy | 264/45.3 |
| 3,811,922 | 5/1974 | Clark et al. | 428/310 X |
| 3,931,098 | 1/1976 | Herweg et al. | 264/45.3 |
| 4,104,435 | 8/1978 | Ballesteros | 264/45.3 X |
| 4,118,531 | 10/1978 | Hauser | 428/280 X |

FOREIGN PATENT DOCUMENTS

| | | | |
|---|---|---|---|
| 2244901 | 3/1973 | Fed. Rep. of Germany | 264/45.3 |
| 2652102 | 6/1977 | Fed. Rep. of Germany | 264/45.3 |

Primary Examiner—Philip Anderson
Attorney, Agent, or Firm—Gordon W. Hueschen

[57] ABSTRACT

A polyurethane cushion material comprising incorporating fiber filament in a foamed polyurethane, and it is produced by crimping the fiber filament, setting it under heating, producing a staple fiber, filling the staple fiber thus formed with a polyurethane into a mold, forming the polyurethane and post-curing it to complete polycondensation.

9 Claims, 7 Drawing Figures

METHOD FOR PRODUCTION OF POLYURETHANE CUSHION MATERIAL

This is a division of application Ser. No. 893,277, filed Apr. 5, 1978, which is a Continuation of Ser. No. 742,568 filed Nov. 17, 1976, now abandoned.

FIELD OF INVENTION AND PRIOR ART

The present invention relates to a method for production of polyurethane cushion material, more particularly, it relates to a method of incorporating a large denier of a fiber filament in a foamed polyurethane.

A polyurethane cushion material is widely used as a cushion material for beds, sheet of vehicles such as cars and trains, chairs, sofas and the like, so its demand is very large.

In the past, the polyurethane cushion material has some defects in that it lacks sufficient rigidity to give shape stability to the cushion material, has low repulsive elasticity, i.e., low resistance to compression and poor recovery, so that it does not return to its original shape after permanent strain when it is used for a long period of time. Thus, it does not retain sufficient cushion effect after it has been used for a long period of time. In order to improve such defects, a spring and the like have been used sometimes as an auxiliary, they have been limited in respect of the spot to be used and the preparation, so they could not exhibit their effects sufficiently. Further the above mentioned problems have not hitherto been described, even if any fillers are incorporated into the polyurethane cushion material.

OBJECTS OF THE INVENTION

Accordingly, an object of the present invention is to provide an improved polyurethane cushion material.

An another object of the present invention is to provide a polyurethane cushion material having good rigidity, large repulsive elasticity and good cushion effect.

Further object of the present invention is to provide a polyurethane cushion material which does not take a permanent set, when it is used for a long period of time.

BRIEF DESCRIPTION OF THE INVENTION

These objects can be attained by a polyurethane cushion material comprising incorporating a large denier of a fiber filament in a foamed polyurethane. The polyurethane cushion material can be produced by crimping a large denier of a fiber filament, setting it under heating, producing a staple fiber, if necessary locking or needle punching it, filling the staple fiber thus formed with a polyurethane, foaming the polyurethane and post-curing it to complete polycondensation.

I have studied on the improvement of rigidity and repulsive elasticity of the polyurethane cushion material and have found that superior effects can be obtained by incorporating a large denier of a fiber filament in a foamed polyurethane. A typical fiber is a synthetic fiber such as polyester, polyamide, polyacrylonitrile, polypropylene, polyvinylidene chloride, vinylon and a natural fiber, preferably synthetic fiber, most preferably polyester fiber. That is to say, the polyester filament is better in rigidity and larger in repulsive elasticity than other synthetic fiber, and has good adhesiveness with polyurethane, further has good workability for filling the filament into the polyurethane if it is a locked or needle punched material and can be filled uniformly.

The filament used in the present invention is 50 to 1,000 denier, preferably 100 to 600 denier.

BRIEF DESCRIPTION OF THE DRAWINGS

The present invention will be understood best in connection with the accompanying drawings wherein.

DETAILED DESCRIPTION OF THE INVENTION

Figure 1:
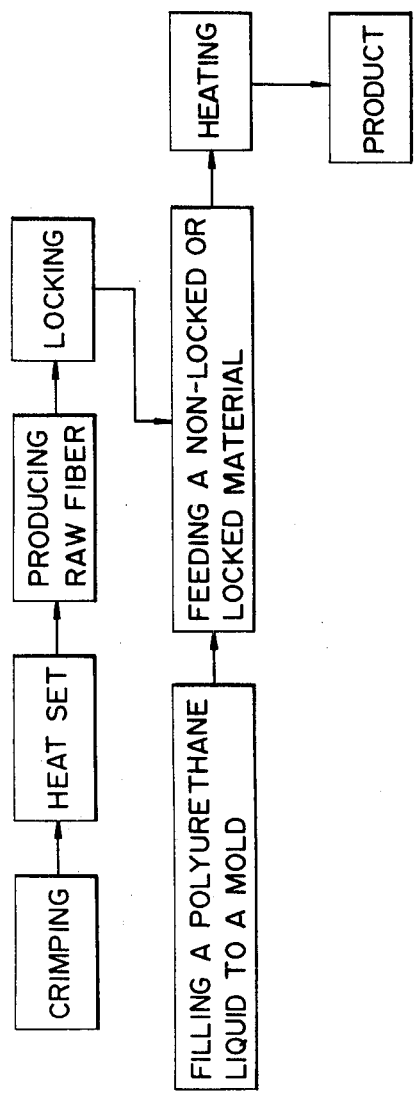
FIG. 1 is a basic block diagram of the process for preparation of a polyurethane cushion material in accordance with the present invention.

A process for the production of the polyurethane cushion material in accordance with the present invention is explained based on FIG. 1 by exemplifying polyethylene terephthalate (hereinafter referred to "polyester") as the fiber filament as follows:

Firstly 50 to 1,000 denier of polyester filament is crimped and set under heating, treated to produce a staple fiber, then shaped into a mass capable of filling at least part of the below mentioned mold, with or without lock treating with an adhesive or needle punching to obtain threeoriented non-locked or locked material. There are various methods for crimping the filament, and three-oriented ones may be produced, for example, by means of the method and device disclosed in Japanese Utility Model Publication No. 40402/74. Heat setting may be carried out at a temperature of 90° to 150° C. by wet heating or 150° to 170° C. by dry heating, preferably 95° to 120° C. by wet heating for 1 to 5 minutes, preferably 1.5 to 3 minutes. Three oriented materials give superior results in respect to rigidity.

Figure 3:
FIG. 3 is a partial perspective view of a double-twisted strand.
Figure 4:
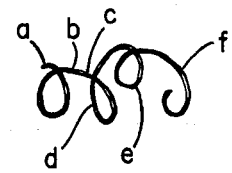
FIG. 4 is a front view of a three oriented filament.

By the term "three-oriented crimp", or the like, is meant crimps which have a three-dimensional curl, as in FIG. 4. These curls are obtained by double twisting a strand, i.e., by giving the strand a single twist and then further twisting it in the same direction until it twists upon itself to form a double-twisted knot, as shown in FIG. 3. This double-twisted material is then heat-set, loosened, cut in staple lengths, and then opened up (i.e., untwisted) into staple fibers of the character shown in FIG. 4, wherein the part "a" coils over the part "b". The part at "c" coils over the at "d". The part at "e", however, coils under the part at "f" and not over it. Thus, the section of the filament from "e" to "d" falls under two bites or coils of the helix and is very much like a helical telephone cord which gets out of whack when one of the coils thereof becomes disoriented with respect to the others.

Then a small amount of polyurethane liquid (polyurethane foamforming components) is fed into a mold for foaming molding by hand-mixing, pouring or continuous method, putting the non-locked or locked material into it and foaming the polyurethane liquid under normal pressure at a temperature of 30° to 50° C., preferably 40° to 45° C. The amount of fed polyurethane liquid is preferably about 3 to about 10 g, especially about 4 to about 6 g per 100 ml of total volume of the mold. Then the foamed polyurethane is subjected to post-curing to complete polycondensation. The post-curing may be carried out a temperature of 150° to 200° C., preferably 180° to 200° C. for 10 to 30 minutes, preferably 20 to 30 minutes in case of a hot cure type and 50° to 90° C., preferably about 80° C. for 5 to 15 minutes, preferably about 10 minutes in case of a cold cure type. The resulting foamed material is removed from the mold to obtain polyurethane cushion material.

The polyurethane foam-forming components used in the present invention may be any conventional ones capable of forming a foamed cushion material obtained by reaction of a polyhydroxy compound such as a polyester, a polyether and the like with an isocyanate. Polyurethanes of this character are well known in the art and are commonly used for forming cushions. It is to be understood, therefore, that any polyurethane useful for forming cushion material can be used. The term "polyurethane", as used herein, is intended to refer only to such materials and to exclude those polyurethane foams which, because of their rigidity or density, would not be useful for forming cushions. Thus, whenever the term polyurethane is used herein, it is to be understood as referring to a foamed polyurethane having a density and a resilience such that it is useful as a cushion material. Foaming method may be one-shot method or prepolymer method. Thus either one liquid type or two liquid type may be used. Typical polyester for preparing the polyurethane are Desmophen 2200, Multon R-68, Daltocel SF, Fomrez 50, Desmophen 2100, etc. Typical polyether are Desmophen 3300, 3400, 3500, 3600, 3700 and 3800, Caradol 5001, 4000 and 3000, Propylan 3, 4 and 305, Niax Triol LG 56, LM 52 and LF 70, Niax Diol and PPG 2025, Voranol P 2000, CP 3000, CP 4000, CP 5000, CP 3001 and CP 3500, Pluracol TP 4040 and TPE 4542, etc. Typical isocyanate are 2,4-tolylenediisocyanate (T-100), 65/35 tolylene diisocyanate (T-65), 80/20 tolylenediisocyanated (T-80), Mondur TD, Desmodur T-80, etc.

The non-locked or locked material may be used in an amount of generally 10 to 50% by weight, preferably 15 to 40% by weight, most preferably 20 to 30% by weight to the total weight of the cushion material. And the polyurethane is foamed so that the density of the foamed polyurethane becomes 0.01 to 0.05 g/cm$^3$, preferably 0.03 to 0.04 g/cm$^3$. Further hot cure type is preferable as the polyurethane to be used.

Figure 2:
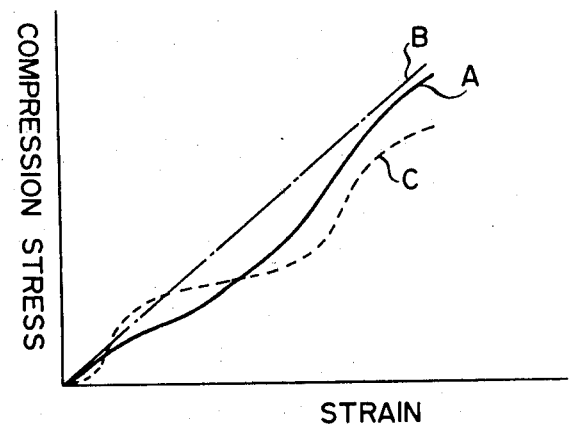
FIG. 2 is a graph showing a relation between compression stress and strain of a cushion material.

The polyurethane cushion material obtained in accordance with the present invention shows an approximately proportional curved line in compression stress and strain as shown by a curved line A in FIG. 2 and is similar to an ideal straight line B, so it has good rigidity. On the contrary, a conventional one forms a horizontal part in between as shown by a curved line C and has bad rigidity. Further the cushion material in accordance with the present invention increased considerably in repulsive elasticity. While the conventional foamed polyurethane took a permanent set and became bad in rigidity when it is used for a long period of time, the polyurethane cushion material in accordance with the present invention does not take a permanent set at all and shows little change in rigidity.

As mentioned above, according to the present invention a polyurethane cushion material having good rigidity, large repulsive elasticity and good cushion property can be obtained, and the polyurethane cushion material which does not decrease in rigidity and does not take a permanent set when it is used for a long period of time can be obtained.

The present invention is exemplified in more detail by the following Examples. Size of the specimens used in the test of physical properties in the following Examples is 200 mm × 200 mm × 100 mm. Results of the tests are summarized in TABLE 1, wherein I.L.D. 25% is the stress (kg) which obtains 20 seconds after the above mentioned specimen is compressed 25% with a disc having 150 mm of diameter from the upper face under 10 mm/sec of compression speed, and the I.L.D. 65% is the stress which obtains when it is similarly compressed 65%. The I.L.D. shows the degree of repulsive elasticity, that is to say, the degree of ability to return to its original shape after being compressed, and the $$\text{sag-factor} = \text{I.L.D. } 65\%/\text{I.L.D. } 25\%$$

shows the degree of rigidity. Generally sag-factor is preferably approximately I.L.D. 65%/I.L.D. 25% = 2.6.

Further, values (%) of repeated compression permanent strain are obtained by measuring thickness of the specimen, held between two parallel plates, compressing it in 50% of the thickness of the specimen repeatedly for continuous 80,000 times under 60 times/min. of speed, removing the specimen, measuring the thickness of the specimens after 30 minutes and calculating by the following equation. There are holes having 6.3 mm of diameter at a distance of 20 mm in the lower plate of the parallel plates for compression.

$$\text{Repeated compression permanent strain} = (t_o - t)/t_o \times 100 \ (\%)$$

wherein $t_o$ is a thickness of specimen before test and t is a thickness of specimen after test.

Further, less than 3% of repeated compression permanent strain is required for a seat for an automobile.

EXAMPLE 1

Figure 5:
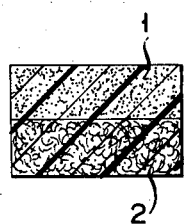
FIGS. 5 to 7 are cross sectional views of the polyurethane cushion material in accordance with the present invention.

Ten to twenty cones (one cone consisted of about 100 to 120 of 300 denier of polyester filament, total denier was 300,000 to 700,000 denier.) were crimped by twisting them into a strand and further twisting the strand in the same direction to yield double twisted state as shown in FIG. 3. Then they were heat set by wet heating at a temperature of 110° C. for 2 minutes. Then the double twisted strand was loosened and the strand was cut into lengths of about 3 inches (76 mm) and the strand thus cut was opened by an opener to obtain three-oriented staple filaments as shown in FIG. 4. These staple filaments were shaped to a mass having desired shape and size by spraying polyacrylonitrile adhesive (Plymal E 934, sold by Sanyo Boeki Kabushiki Kaisha) onto it to obtain a locked material. Two liquid type polyurethane monomer comprising TDI 80 (34.7 g), G-300 (140 g), DABCO (0.2 g), t-9 (0.3 g), L 540 92.0 g), R-11 (10 g) and water (3.5 g) sold by Mitsubishi Kasei Kabushiki Kaisha was fed into a mold and the locked material was filled into the mold and then polyurethane was foamed at a temperature of 20° C. under normal pressure. The foam thus formed was heated at a temperature of 200° C. for 30 minutes to obtain a polyurethane cushion material having a cross sectional view as shown in FIG. 5. Polyurethane 1: locked material 2 was 7.2:1 (by weight).

EXAMPLE 2

Figure 6:
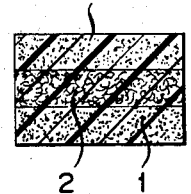

A similar method as in Example 1 was carried out except that 200 denier of polyester filament was used instead of 300 denier of one to obtain a polyurethane cushion material having a cross sectional view as shown in FIG. 6. Polyurethane 1: locked material 2 was 3.8:1 (by weight).

EXAMPLE 3

Figure 7:
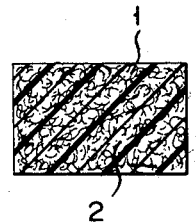

A similar method as in Example 1 was carried out except that the locked material obtained in Example 1 was filled uniformly ito a whole mold to obtain a polyurethane cushion material having a cross sectional view as shown in FIG. 7. Polyurethane 1: locked material 2 was 3.1:1 (by weight).

EXAMPLE 4

A similar method as in Example 1 was carried out except that a non-locked material which was prepared by using 200 denier of polyester filament without locking with the adhesive by a similar method as Example 1 was filled uniformly into a whole mold to a polyurethane cushion material having a cross sectional view shown in FIG. 7. Polyurethane 1: non-locked material 2 was 3:1 (by weight).

EXAMPLE 5

A non-locked material was formed by a similar method as in Example 1 except that the filament was not locked with the adhesive. The non-locked material was filled uniformly into a mold by a similar method as in Example 1 to obtain a polyurethane cushion material having a cross sectional view as shown in FIG. 7. Polyurethane 1: non-locked material 2 was 3:1 (by weight).

EXAMPLE 6

A similar method as in Example 1 was carried out except that the locked material used in Example 2 was filled into a whole mold to obtain a polyurethane cushion material having a cross sectional view as shown in FIG. 7. Polyurethane 1: locked material 2 was 3:1 (by weight).

CONTROL a foamed polyurethane was obtained by using the same polyurethane as in Example 1.

TABLE 1

| EXAMPLE | Density ($\times 10^{-3}$) | I.L.D. 25% (kg) | I.L.D. 65% (kg) | Sag-factor | Repeated permanent compression strain (%) |
|---|---|---|---|---|---|
| 1 | 4.458 | 12.0 | 27.5 | 2.29 | max. 1 |
| 2 | 5.003 | 15.8 | 37.5 | 2.37 | max. 1 |
| 3 | 5.143 | 20.9 | 47.0 | 2.25 | max. 1 |
| 4 | 5.147 | 21.9 | 47.4 | 2.17 | max. 1 |
| 5 | 5.61 | 21.7 | 49.9 | 2.30 | max. 1 |
| 6 | 5.82 | 26.3 | 63.1 | 2.40 | max. 1 |
| CONTROL | 4.532 | 9.8 | 20.1 | 2.05 | max. 3 |

As being clear from TABLE 1, all of the specimens filled with the locked or non-locked material of polyester filament were considerably higher in I.L.D. than the conventional cushion material, and especially the specimens filled with the locked or non-locked material had more than two times of repulsive elasticity compared with the conventional one. Further, the sag-factor which shows a merit of rigidity is 10% or more bigger compared with the conventional one. Furthermore, repeated compression permanent strain was considerably improved compared with the conventional one.

What is claimed is:

1. A method for production of a polyurethane cushion material comprising crimping a strand of large denier of a fiber filament by twisting the strand in a single twist and then further twisting it in the same direction to yield a double-twisted strand, setting it while double-twisted by wet heating, loosening the double-twisted, heat-set strand, and cutting it into staple lengths, and opening the cut staple lengths to form a three-oriented, crimped fiber filament, filling a mold with a mass of staple fiber thus formed together with polyurethane foam-forming components, foaming the polyurethane components, and post-curing the foam to complete polycondensation.

2. A method according to claim 1, wherein the fiber filament is 50 to 1,000 denier.

3. A method according to claim 1, wherein the mass of staple fibers is locked material.

4. A method according to claim 1, wherein the mass of staple fibers is nonlocked material.

5. A method according to claim 1, wherein the fiber filament is filled uniformly in a whole of a mold.

6. A method according to claim 1, wherein the fiber filament is filled partially in a mold.

7. A method according to claim 2, wherein the heat setting of the crimped fiber filament is carried out at a temperature of 90° to 150° C. for 1 to 5 minutes under wet conditions.

8. A method according to claim 1, wherein the fiber filament is a synthetic fiber.

9. A method according to claim 8, wherein the synthetic fiber is polyester.

* * * * *

UNITED STATES PATENT AND TRADEMARK OFFICE
CERTIFICATE OF CORRECTION

PATENT NO. : 4,296,054
DATED : October 20, 1981
INVENTOR(S) : Sadaaki Takagi

It is certified that error appears in the above—identified patent and that said Letters Patent is hereby corrected as shown below:

Col. 4, line 59; "t-9" should read -- T-9 --
Col. 5, line 15; "ito" should read -- into --
Col. 5, line 56; "a" should read -- A --

*Signed and Sealed this*

*Twenty-third* Day of *February 1982*

[SEAL]

*Attest:*

GERALD J. MOSSINGHOFF

*Attesting Officer*  *Commissioner of Patents and Trademarks*